Aug. 26, 1941.  E. F. SMITH  2,253,657

REFRIGERATING APPARATUS

Filed March 9, 1939  2 Sheets-Sheet 1

INVENTOR
Emil Frank Smith
BY Spencer Hardman and Fehr
ATTORNEYS

Aug. 26, 1941.      E. F. SMITH      2,253,657
REFRIGERATING APPARATUS
Filed March 9, 1939      2 Sheets-Sheet 2
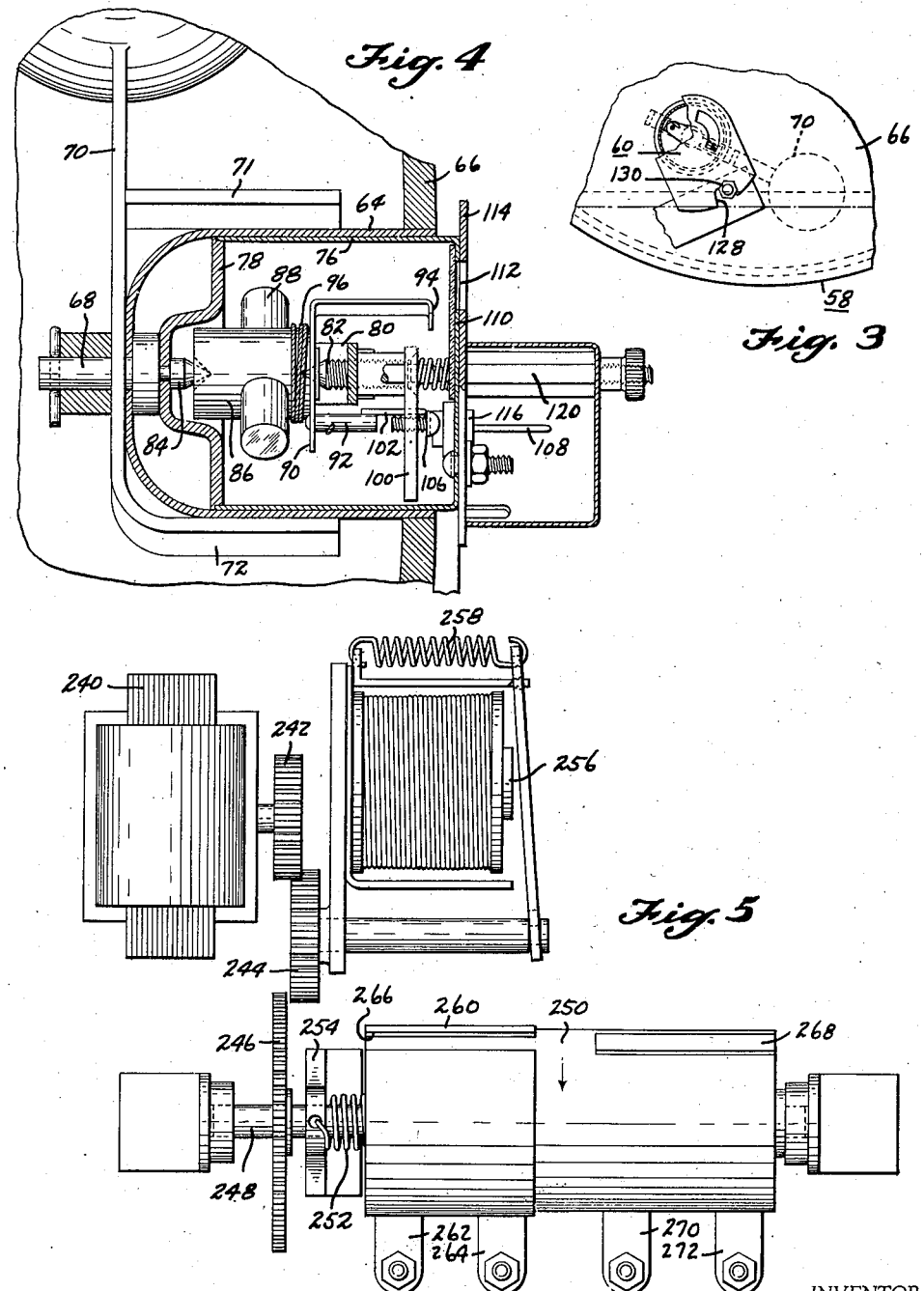

Patented Aug. 26, 1941

2,253,657

UNITED STATES PATENT OFFICE 2,253,657

REFRIGERATING APPARATUS

Emil Frank Smith, Chicago, Ill., assignor to General Motors Corporation, Dayton, Ohio, a corporation of Delaware Application March 9, 1939, Serial No. 260,786

4 Claims. (Cl. 62—1)

This invention relates to refrigerating apparatus and more particularly to means for indicating a loss of refrigerant from the system.

In large refrigerating systems a leak may cause a considerable loss of refrigerant. The refrigerants ordinarily used in such systems are rather expensive and if a leak is not discovered or isolated within a short time a considerable loss of refrigerant may occur. In some localities the code requires that some sort of a safety device be used to indicate the loss of refrigerant. I find that the systems heretofore employed for this purpose are either very expensive or they do not operate properly. For example, many of the more simple systems give an indication of loss of refrigerant when actually no loss has occurred.

It is an object of my invention to provide an improved simple refrigerant detecting system which will indicate when a predetermined loss of refrigerant has occurred and which will not give false indications.

It is another object of my invention to provide an indicating device for indicating loss of refrigerant which is operative only when the system is in proper condition for making a test for the loss of refrigerant.

It is still another object of my invention to provide a system for indicating a loss of refrigerant which is controlled by a timing device.

It is still another object of my invention to provide an indicating device which is operative only when the refrigerating system is idle.

Further objects and advantages of the present invention will be apparent from the following description, reference being had to the accompanying drawings, wherein a preferred form of the present invention is clearly shown.

In the drawings:

Fig. 3 is a fragmentary view of the float controlled switch for the receiver;

Fig. 4 is an enlarged sectional view of the float controlled switch shown in Fig. 3; and Fig. 5 is a view of the timing device for the indicating means.

Briefly, I have shown an air conditioning system in which each of the evaporating means is controlled by an individual thermostat controlling a solenoid valve in the liquid line of its evaporating means. The motor-compressor unit is controlled by a low pressure control switch. The receiver is provided with a float controlled switch which is energized only after all of the solenoid valves have been closed for a period sufficiently long that a substantially fixed proportion of the refrigerant in the system has been transferred to the receiver. When the liquid level within the receiver at that time is below a predetermined level the float controlled switch will be closed thereby causing the operation of the signaling device.

The refrigerating system

Figure 1:
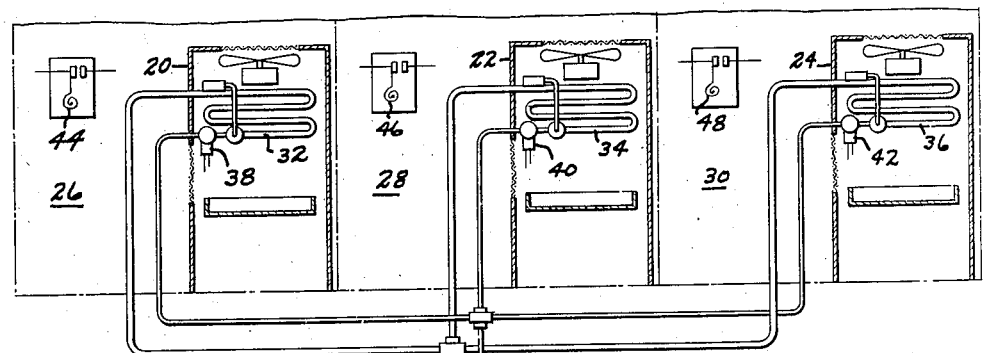
Fig. 1 is a diagrammatic view of a large multiple air conditioning compression refrigerating system embodying one form of my invention.

Referring now to the drawings and more particularly to Fig. 1 there are shown air conditioning units 20, 22 and 24 which are located within separate compartments 26, 28 and 30. These air conditioning units 20, 22 and 24 are provided with refrigerant evaporating means 32, 34 and 36 which are provided with the usual thermostatic automatic expansion valves and in addition, the solenoid operated liquid line valves 38, 40 and 42 which open when energized and close when deenergized. These solenoid valves 38, 40 and 42 are controlled by thermostat switches 44, 46 and 48 which are located within the rooms or chambers 26, 28 and 30. The outlet of each of these evaporating means is connected by a refrigerant conduit to a common suction conduit 50 which connects to the inlet of the compressor 52.

The compressor 52 is driven by an electric motor 54 for withdrawing evaporated refrigerant from the evaporating means and compressing the refrigerant and forwarding the compressed refrigerant to the condenser 56 where the compressed refrigerant is liquefied and collected in a receiver 58. From the receiver 58 the liquid refrigerant is forwarded through a common liquid line 60 to individual liquid lines connecting to the solenoid valves 38, 40 and 42 which control the supply of liquid to the evaporating means 32, 34 and 36. The operation of the motor-compressor unit 54 is controlled by a low pressure switch 62 having its bellows connected by a capillary tube to the common suction conduit 50.

The float controlled switch

The receiver 58 is provided with a float controlled switch means of the type which is disclosed in Patent No. 2,067,638 to James R. Hornaday. Figs. 3 and 4 show a sufficient portion of this float controlled device to illustrate its operation. The receiver 58 has a cup-shaped member 64 sealed to the end wall 66. A fixed stud 68 mounted on the end of the cup 64 inside of the receiver 58 forms a pivot which carries a float member 70 also located inside the receiver. The float member 70 is provided with U-shaped arms 71 and 72 which extend adjacent the walls of the cup member 64. These arm portions 71 and 72 are made of a magnetic material, such as iron, while the cup-shaped member 64 is made of a non-magnetic material, such as brass.

Within the cup member 64 is removably positioned a float operated switch 60 comprising a cylindrical shell 76 of a non-magnetic material, such as brass, which is closed at its inner end by an end plate 78. A U-shaped bracket 80 is secured to the end plate 78 and carries centrally of the shell an adjustable pivot 82. A fixed pivot 84 is secured to the central portion of the end plate 78. Between the pivots 82 and 84 there is mounted a movable member comprising a hub 86 and a transverse bar 88 of magnetic material, such as iron. Preferably the bar 88 is permanently magnetized although if desired the portions 71 and 72 may be permanently magnetized. The hub 86 also carries an arm 90 upon which is mounted at one end a stud 92 which forms a movable contact member. The arm 90 at its opposite end is formed into an indicator pointer 94.

A flexible conductor 96 is connected to the bracket 80 and to the stud 92 to insure continuity of the electrical circuit. The bracket 80 also carries an insulated plate 100. The plate 100 in turn carries a fixed contact 102 which is positioned in the path of movement of the stud 92. The contact 102 is clamped to the plate 100 by a screw 106. This screw 106 is connected by a conductor to the electrical terminal 108. The base 110 is provided with an opening 112 through which the pointer 94 may be viewed. The base 110 and the plate 114 are provided with an insulating bushing 116 through which the terminal 108 extends. The assembly comprising the end plate 78, the bracket 80, the plate 100 and their associated parts is secured in the shell 76 and the shell 76 is in turn secured to the plate 114 by bolts and by the post 120.

In operation of the device the float 70 moves in response to changes in the liquid refrigerant level within the receiver 58 and carries with it the magnetic portions 71 and 72. The cross bar 88 is caused to follow the movement of the float 70 by magnetic attraction thus moving the pointer 94 and the movable contact 92 in response to changes in the liquid level. When the float 70 has fallen sufficiently the movable contact 92 will be carried into contact with the stationary contact 102 thus closing the float operated contacts. The plate 114 and the entire assembly within the cup 94 may be turned so as to change the level at which the contact 92 makes contact with the contact 102. For this purpose a slot 128 is provided in the end plate 114 for limiting the movement of the end plate and a nut and stud 130 is provided for clamping the end plate 114 in the desired position.

The leak detecting system

Figure 2:
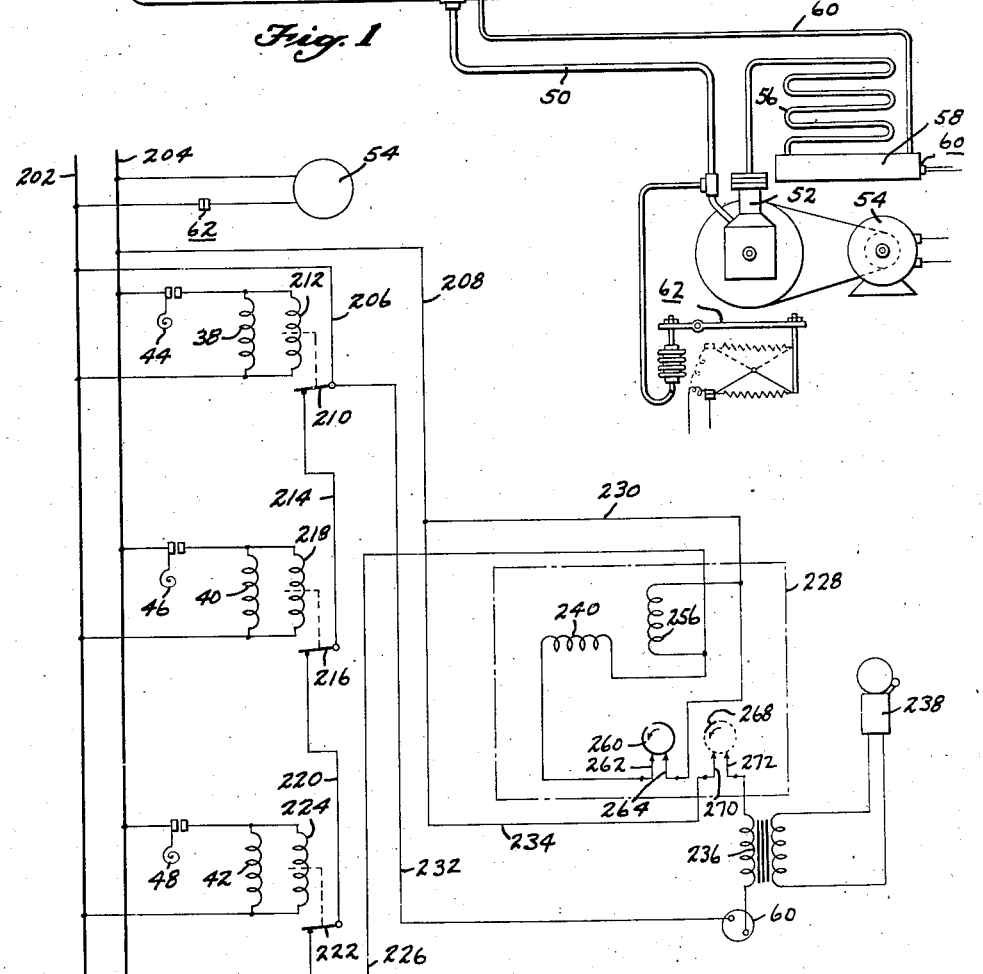
Fig. 2 is a wiring diagram for the refrigerating system shown in Fig. 1, together with a wiring diagram of the indicating device for the system shown in Fig. 1.

Referring now more particularly to the wiring diagram shown in Fig. 2, the supply conductors which supply electricity to the entire system are designated by the reference characters 202 and 204. The compressor motor 54 is connected to these supply conductors in series with the low pressure control contacts 62. Also connected to the supply conductors 202 and 204 are the solenoids of the solenoid valves 38, 40 and 42. Connected in series with these solenoids are the thermostats 44, 46 and 48. Each of these thermostats and their respective solenoid valves are connected in series with each other and in parallel with the supply conductors 202 and 204.

Also connected in parallel with the supply conductors 202 and 204 is a primary indicating circuit which includes the conductors 206 and 208. The conductor 206 connects first to a solenoid operated switch 210, which is closed when deenergized and opened when its solenoid is energized. The solenoid operating the switch 210 is designated by the reference character 212 and this solenoid 212 is connected in parallel with the solenoid of the solenoid valve 38. Both the solenoids 38 and 212 are connected in series with thermostat 44. The switch 210 is connected by the conductor 214 to a similar solenoid operating switch 216 having its solenoid 218 connected in series with the thermostat 46 and in parallel with the solenoid 40. The switch 216 is closed when deenergized and opened when energized. The switch 216 is connected by the conductor 220 to a similar solenoid operated switch 222 having its operating solenoid 224 in parallel with the solenoid valve 42 and in series with the thermostat 48. Like the other solenoid switches the switch 222 is closed when deenergized and opened when energized.

Thus all three switches are connected in series with each other and the switch 222 is connected by a conductor 226 to one terminal of a time delay device 228. The conductor 208 is also connected by a conductor 230 to a second terminal of the time delay device 228. These two conductors 226 and 230 supply the electric energy necessary to start and operate the time delay device 228. In order to supply the electrical energy which is controlled by the float operated switch 60 a conductor 232 is provided connecting the conductor 206 directly to the float switch 60 and another conductor 234 is connected to one of the contacts operated by the time delay device 228. Also connected in series with the float operated switch 60 and the contacts operated by the time delay device 228 is a step-down door bell transformer 236 to which is connected a door bell 238 or other suitable signaling device, such as a lamp, which rings when the transformer 236 is energized by the closing of the circuit through the conductors 232 and 234, which includes the contacts 268, 270 and 272 operated by the time delay device 228 and the float switch 60.

Operation of the leak detecting system

By this system the closing of any one of the thermostats 44, 46 and 48 prevents the energization of the time delay device since the closing of any one of these thermostats will energize one of the solenoid switches 212, 218 or 224 to open one of the switches 210, 216 or 222 which will prevent the supply of energy to the time delay device 228. As long as no current is supplied to the time delay device 228, the contacts 268, 270 and 272 operated by the time delay device 228 will open and the transformer 236 cannot be energized. It is only when all three thermostat switches 44, 46 and 48 are in the open position, and thus all three switches 210, 216 and 222 are in the closed position, that the time delay device 228 will be energized.

The starting and continued energization of the time delay device 228 will cause the closing of the contacts 268, 270 and 272 operated by the time delay device 228 after a definite period of time for which the time delay device 228 is set. When these contacts 268, 270 and 272 are closed, the energization of the transformer 236 will depend upon the liquid level within the receiver 58. The time delay device 228 is preferably set to close the contacts 268, 270 and 272 after a sufficient period of time to insure that substantially all of the refrigerant within the system has been transferred to the receiver 58. For this purpose the low pressure switch 62 is preferably set so that it will not open until the pressure within the suction line has been reduced to a predetermined low value. If after the closing of the time delay operated contacts 268, 270 and 272 the liquid level within the receiver 58 is sufficiently high the contacts operated by the float switch 60 will remain in open position and the transformer 236 will not be energized. If, however, the liquid level within the receiver 58 at this time has fallen to a predetermined low limit the contacts of the float operated switch 60 will be closed and the transformer 236 will be energized to cause the ringing of the bell 238 and for the lighting of one or more signal lamps.

The time delay mechanism

It is not necessary that any particular form of time delay device be used, but for the purpose of illustration I have shown one particular form which is satisfactory for this purpose. In this form there is shown a self-starting synchronous motor 240 which is provided with a gear 242 meshing with an idler gear 244 to drive a larger gear 246 fixed to a rotatable shaft 248 which also carries a contact drum 250. This contact drum 250 is fixed to the shaft 248 but is connected by a light coil spring 252 to an anchor 254. The position of the idler gear 244 is controlled by a solenoid 256. When the solenoid 256 is energized it will move the idler gear 244 into engagement with the gears 242 and 246 so that the motor 240 will slowly rotate the drum 250. When the solenoid 256 is deenergized its retracting spring 258 will pull the idler gear 244 out of engagement with the drum gear 246 thereby permitting the spring 252 to immediately return the drum 250 to starting position. Thus any deenergization of the time delay device 228 at any time will return the drum 250 to its starting position thereby preventing the energization of the transformer 236 and the bell 238.

The contact drum 250 carries a contact portion 260 at one end which is adapted to make contact with the contacts 262 and 264 in order to close the circuit within the time delay device 228 to energize the motor 240 and the solenoid 256. This contact portion 260, however, is provided with a gap 266 which, when the drum 250 is turned sufficiently far indicating the lapse of the predetermined delay period, will reach the contacts 262 and 264 and they will no longer be bridged by the contact portion 260. However, the drum 250 also carries the contact 268 which is adapted to bridge the contacts 270 and 272 when the gap 266 reaches the contacts 262 and 264. It should be noted that when the gap 266 reaches contacts 262 and 264 that the motor 240 will be deenergized to stop the rotation of the drum since the contacts 262 and 264 are connected directly in series with the motor 240. However, the solenoid 256 is connected in parallel with the contacts 262 and 264 so that it will remain energized and prevent the releasing of the drum 250. Therefore the drum will remain in this position with the contact 268 bridging the contacts 270 and 272 to permit the energization of the transformer 236 by the closing of the float switch 60 as long as the refrigerating system is not in operation. However, as soon as the refrigerating system starts, the closing of any one of the thermostats will deenergize the time delay device thereby deenergizing the solenoid 256 to permit the spring 258 to pull the idler gear 244 out of engagement with the drum gear 246 to permit the drum 250 to return to its starting position under the influence of the spring 252.

If desired the transformer 236 may be caused to operate other signaling devices and the current flowing through the float control switch 60 may be caused to operate solenoid valves or switches for shutting off any portion of the refrigerating system or for preventing operation of the motor-compressor unit. If desired an additional switch which is closed when the low pressure switch is open, may be connected in the conductor 226 in series with the switches 210, 216 or 222. Also, if desired, such a switch, which is opened when the switch 62 is closed and which is closed when the switch 62 is open, may be substituted for the three switches 210, 216 and 222 in certain types of installation.

While the form of embodiment of the invention as herein disclosed, constitutes a preferred form, it is to be understood that other forms might be adopted, all coming within the scope of the claims which follow.

What is claimed is as follows:

1. Refrigerating apparatus including a cooling unit, circulating means for circulating a refrigerant medium through the cooling unit, means for controlling the circulation of refrigerant medium through the cooling unit, means for indicating a change in the quantity of the refrigerant medium in a portion of the apparatus, means for preventing the effective operation of the indicating means when refrigerant medium circulates through the cooling unit, and means for delaying the effective operation of the indicating means for a period of time following the stopping of the circulation through the cooling unit.

2. Refrigerating apparatus including a cooling unit, circulating means for circulating a refrigerant medium through the cooling unit, means for controlling the circulation of refrigerant medium through the cooling unit, means for indicating a change in the quantity of the refrigerant medium in a portion of the apparatus, means for preventing the effective operation of the indicating means when refrigerant medium circulates through the cooling unit, and means for operating the circulating means until there is attained a predetermined condition of the refrigerant medium.

3. Refrigerating apparatus including a cooling unit, circulating means for circulating a refrigerant medium through the cooling unit, means for controlling the circulation of refrigerant medium through the cooling unit, means for indicating a change in the quantity of the refrigerant medium in a portion of the apparatus, means for preventing the effective operation of the indicating means when refrigerant medium circulates through the cooling unit, means for operating the circulating means until there is attained a predetermined condition of the refrigerant medium, and time delay means for delaying the effective operation of the indicating means for a period of time following the stopping of the circulation through the cooling unit.

4. Refrigerating apparatus including a plurality of evaporating means, a liquefying means including a compressor and a condenser for withdrawing evaporated refrigerant from and for supplying liquid refrigerant to said evaporating means, means for indicating a change in the quantity of refrigerant within a portion of the system, means for individually rendering the evaporating means ineffective independently of each other, and means for rendering the indicating means inoperative whenever any one of the evaporating means is effective.

EMIL FRANK SMITH.